United States Patent [19]
Lee

[11] Patent Number: 6,003,096
[45] Date of Patent: Dec. 14, 1999

[54] HOST INTERFACE CIRCUIT FOR PREVENTING DATA LOSS AND IMPROVING INTERFACE SPEED FOR AN IMAGE FORMING APPARATUS BY LATCHING RECEIVED DATA IN RESPONSE TO A STROBE INPUT SIGNAL

[75] Inventor: Sung-Hee Lee, Gunpo, Rep. of Korea

[73] Assignee: SamSung Electronics Co., Ltd., Suwon, Rep. of Korea

[21] Appl. No.: 08/950,100

[22] Filed: Oct. 14, 1997

[30] Foreign Application Priority Data

Oct. 17, 1996 [KR] Rep. of Korea ...................... 96-46537

[51] Int. Cl.[6] ..................................................... G06F 17/00
[52] U.S. Cl. .............................. 710/1; 345/501; 345/502; 375/260; 395/101; 365/193
[58] Field of Search ..................................... 395/113, 119, 395/104, 293, 163, 162, 107, 101, 108, 112, 873, 734, 841, 14, 872; 347/5; 345/501, 502, 508, 213; 364/231.8, 948.34; 340/747; 711/5, 146; 382/307, 232; 375/260; 365/193; 710/1

[56] References Cited

U.S. PATENT DOCUMENTS

| | | | |
|---|---|---|---|
| 4,750,107 | 6/1988 | Buggert | 395/841 |
| 5,060,239 | 10/1991 | Briscoe et al. | 375/260 |
| 5,113,494 | 5/1992 | Menendez et al. | 345/502 |
| 5,157,761 | 10/1992 | Hawkes | 395/107 |
| 5,163,132 | 11/1992 | DuLac et al. | 395/873 |
| 5,408,590 | 4/1995 | Dvorzsak | 395/104 |
| 5,428,714 | 6/1995 | Yawata et al. | 395/112 |
| 5,572,691 | 11/1996 | Koudmani | 711/5 |
| 5,577,213 | 11/1996 | Avery et al. | 395/280 |
| 5,604,608 | 2/1997 | Walsh et al. | 358/486 |
| 5,608,883 | 3/1997 | Kando et al. | 395/309 |
| 5,615,390 | 3/1997 | Kurahara | 395/834 |
| 5,630,094 | 5/1997 | Hayek et al. | 711/146 |
| 5,640,571 | 6/1997 | Hedges et al. | 395/734 |
| 5,671,445 | 9/1997 | Gluyas et al. | 395/873 |
| 5,704,023 | 12/1997 | Kim | 395/114 |

*Primary Examiner*—Meng-Ai T. An
*Assistant Examiner*—John L Ciccozzi
*Attorney, Agent, or Firm*—Robert E. Bushnell, Esq.

[57] ABSTRACT

A host interface circuit for an image forming apparatus interfaces parallel data received from a host. The host interface circuit alternately latches received data in first and second latch circuits each time a strobe input signal is received from the host. The strobe input signal is processed by a noise filter and then provided to a select logic circuit which, in turn, provides first and second select signals to the first and second latch circuits and to first and second interrupt control circuits. The latter drive a central processing unit (CPU) interrupt drive circuit. Data from the two latch circuits are multiplexed and buffered prior to provision to the CPU. Acknowledge, hardware-busy and software-busy signals are also generated.

25 Claims, 5 Drawing Sheets

HOST INTERFACE CIRCUIT FOR PREVENTING DATA LOSS AND IMPROVING INTERFACE SPEED FOR AN IMAGE FORMING APPARATUS BY LATCHING RECEIVED DATA IN RESPONSE TO A STROBE INPUT SIGNAL

CLAIM OF PRIORITY

This application makes reference to, incorporates the same herein, and claims all benefits accruing under 35 U.S.C. §119 from an application for HOST INTERFACE CIRCUIT OF IMAGE FORMING APPARATUS earlier filed in the Korean Industrial Property Office on the 17$^{th}$ of October 1996 and there duly assigned Ser. No. 46537/1996.

BACKGROUND OF THE INVENTION

1. Technical Field

The present invention relates to an image forming apparatus for processing data transmitted to and received from a host and, more particularly, to a host interface circuit for interfacing parallel data received from a host.

2. Related Art

Generally, an image forming apparatus, (for example, a printer) is connected to a host (such as a personal computer) so as to transmit and receive data from the host. The image forming apparatus includes a host interface circuit for interfacing the data transmitted to and received from the host.

In such conventional arrangements, the host interface circuit is often used in a low-speed image forming apparatus and is connected to a high-speed host to receive data therefrom. In such an arrangement, the host can transmit data before the image forming apparatus has a chance to generate a busy signal after transmission of one byte of data by the host. Thus, the data can collide with previous data, resulting in the inadvertent loss of data.

The following patents are considered to be representative of the prior art relative to the invention disclosed herein, and are burdened by the disadvantages discussed above.: U.S. Pat. No. 5,671,445 to Gluyas et al., entitled Interface For Transmitting Graphics Data To A Printer From A Host Computer System In Rasterized Form, U.S. Pat. No. 5,640,571 to Hedges et al., entitled Interrupt Steering For A Computer System, U.S. Pat. No. 5,630,094 to Hayek et al., entitled Integrated Bus Bridge And Memory Controller That Enables Data Streaming To A Shared Memory Of A Computer System Using Snoop Ahead Transactions, U.S. Pat. No. 5,615,390 to Kurahara, entitled System For Determining And Controlling The Input/Output Mode Of Input/Output Terminal Of Microcomputer Using Reset Signal Change Point Detection Circuit, U.S. Pat. No. 5,608,883 to Kando et al., entitled Adapter For Interconnecting Single-Ended And Differential SCSI Buses To Prevent 'Busy' Or 'Wired-OR' Glitches From Being Passed From One Bus To The Other, U.S. Pat. No. 5,604,608 to Walsh et al., entitled Device And Method For Controlling The Scan Speed Of An Image Input Terminal To Match The Throughput Constraints Of An Image Processing Module, U.S. Pat. No. 5,577,213 to Avery et al., entitled Multi-Device Adapter Card For Computer, U.S. Pat. No. 5,572,691 to Koudmani, entitled Apparatus And Method For Providing Multiple Data Streams From Stored Data Using Dual Memory Buffers, U.S. Pat. No. 5,163,132 to DuLac et al., entitled Integrated Controller Using Alternately Filled And Emptied Buffers For Controlling Bi-Directional Data Transfer Between a Processor And A Data Storage Device, and U.S. Pat. No. 4,750,107 to Buggert, entitled Printer-Tape Data Link Processor With DMA Slave Controller Which Automatically Switches Between Dual Output Control Data Chomels.

SUMMARY OF THE INVENTION It is an object of the present invention to provide a host interface circuit which can prevent a collision between data and the loss of data.

It is another object of the present invention to provide a host interface circuit which can improve interface speed with a host.

It is yet another object of the present invention to provide a host interface circuit in which a CPU is not subject to load.

According to one feature of the present invention, a host interface circuit of an image forming apparatus for interfacing parallel data received from a host is characterized in that received data are alternatively latched in two latch circuits each time a strobe input signal is received from the host.

In the following description and accompanying drawings, numerous specific details, such as detailed signals, operational timing charts, processing flows, etc. are set forth to provide a more thorough understanding of the present invention. However, it will be apparent to one skilled in the art that the present invention may be practiced without these specific details. Further, well-known features and constructions are not described in detail since they would obscure the present invention in unnecessary detail.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
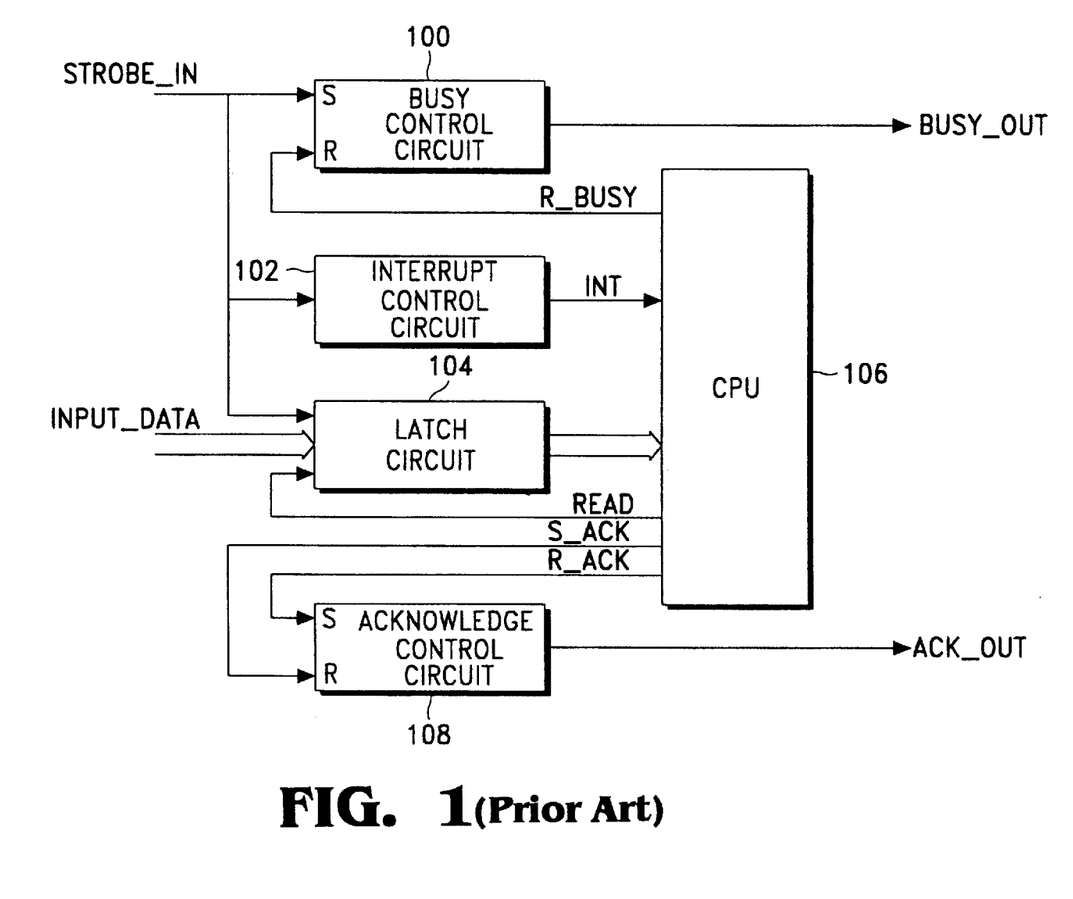
FIG. 1 is a block diagram showing a conventional host interface circuit.

One example of a conventional host interface circuit used to interface the data received from the host is shown in FIG. 1. The conventional host interface circuit includes, as shown in FIG. 1, a busy control circuit 100, an interrupt control circuit 102, a latch circuit 104, a central processing unit (CPU) 106, and an acknowledge control circuit 108. The busy control circuit 100 generates a busy signal BUSY_OUT in response to a strobe input signal STROBE_IN received from a host. The interrupt control circuit 102 generates an interrupt signal INT in response to the strobe input signal STROBE_IN. Data received from the host are latched in the latch circuit 104. The CPU 106 supplies a read signal READ to the latch circuit 104 in response to the interrupt signal INT so as to read data latched in the latch circuit 104. Moreover, the CPU 106 generates an acknowledge setting signal S_ACK to set the acknowledge control circuit 108, which generates an acknowledge signal ACK_OUT. After a predetermined time, the CPU 106 generates a busy resetting signal R_BUSY and an acknowledge resetting signal R_ACK. As a result, the busy control circuit 100 and the acknowledge control circuit 108 are reset, and the busy signal BUSY_OUT and the acknowledge signal ACK_OUT are negated.

If the above host interface circuit is used in a low-speed image forming apparatus and is connected to a high-speed host to receive data, the host can transmit subsequent data before the image forming apparatus generates a busy signal after the host transmits one byte of data. Thus, the data can collide with the previous data and data are lost. That is, since the conventional host interface circuit receives only one byte of data at a time, if it is used in a low-speed image forming apparatus and is connected to a high-speed host, there may be a collision between data received from the host, with resultant loss of data. Furthermore, since the acknowledge signal is generated under control of the CPU, the CPU is subject to load.

Figure 2:
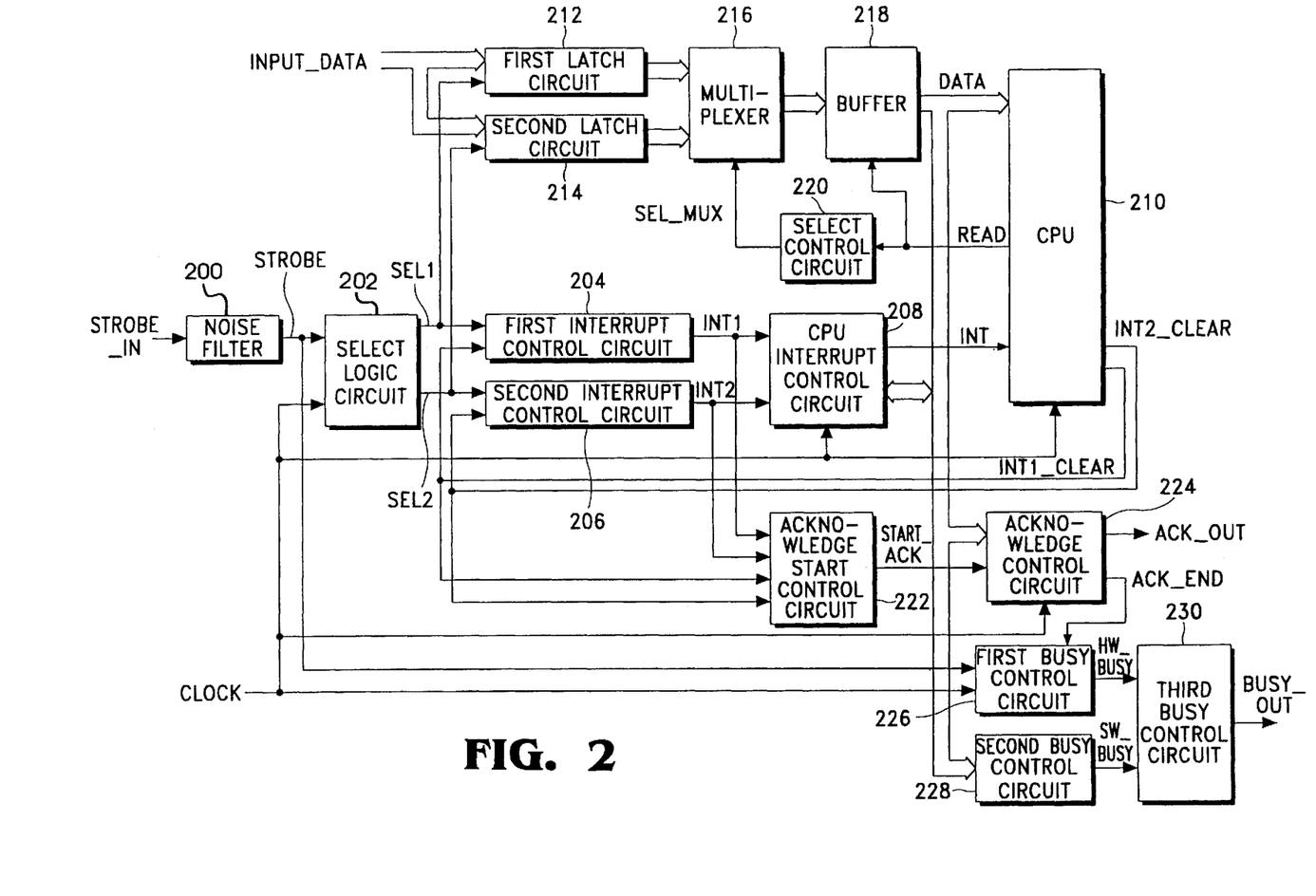
FIG. 2 is a block diagram showing a host interface circuit according to the present invention.

FIG. 2 is a block diagram of a host interface circuit according to the present invention.

Referring to FIG. 2, a strobe input signal STROBE_IN and input data INPUT_DATA are received from a host, and an acknowledge signal ACK_OUT and a busy signal BUSY_OUT are transmitted to the host. A clock signal CLOCK is supplied as a reference clock to a select logic circuit 202, a CPU interrupt control circuit 208, a CPU 210, an acknowledge control circuit 224, and a first busy control circuit 226.

A noise filter 200 filters the strobe input signal STROBE_IN received from the host and generates a strobe signal STROBE. The strobe signal STROBE is applied to the select logic circuit 202 and the first busy control circuit 226. The select logic circuit 202 alternately generates a first select signal SEL1 and a second select signal SEL2 each time the strobe signal STROBE (resulting from receipt of STROBE_IN) is received. The first select signal SEL1 is applied to a first latch circuit 212 and a first interrupt control circuit 204. The second select signal SEL2 is applied to a second latch circuit 214 and a second interrupt control circuit 206.

The first interrupt control circuit 204 and second interrupt control circuit 206 generate first and second interrupt signals INT1 and INT2, respectively, in response to the first and second select signals SEL1 and SEL2, respectively, and circuits 204 and 206 are respectively cleared by first and second interrupt clear signals INT1_CLEAR and INT2_CLEAR generated by the CPU 210. The first and second interrupt signals INT1 and INT2 are each supplied to the CPU interrupt control circuit 208 and to an acknowledge start control circuit 222. The CPU interrupt control circuit 208 generates a CPU interrupt signal INT each time the first and second interrupt signals INT1 and INT2 are generated, and supplies the CPU interrupt signal INT to the CPU 210.

The first and second latch circuits 212 and 214 alternately latch the input data INPUT_DATA received from the host together with the strobe input signal STROBE_IN in response to the first and second select signals SEL1 and SEL2. A multiplexer 216 alternately generates data latched in the first and second latch circuits 212 and 214, respectively, according to a multiplexer select signal SEL_MUX. A select control circuit 220 generates the multiplexer select signal SEL_MUX with alternately different logic states whenever a read signal READ is received from the CPU 210. A buffer 218 stores data generated by the multiplexer 216 in response to the read signal READ.

The CPU 210 generates the read signal READ when the CPU interrupt signal INT is supplied by circuit 208, and reads data stored in the buffer 218. The CPU 210 also generates one of the first and second interrupt clear signals INT1_CLEAR and INT2_CLEAR, respectively, in correspondence to a current interrupt.

The acknowledge start control circuit 222 generates an acknowledge start signal START_ACK when the first and second interrupt signals INT1 and INT2 are cleared by the first and second interrupt clear signals INT1_CLEAR and INT2_CLEAR, respectively. The acknowledge control circuit 224 generates the acknowledge signal ACK_OUT and provides it to the host in response to the acknowledge start signal START_ACK. Moreover, circuit 224 negates the acknowledge signal ACK_OUT after a predetermined time interval and generates an acknowledge end signal ACK_END. The first busy control circuit 226 generates a hardware busy signal HW_BUSY in response to the strobe signal STROBE until the acknowledge end signal ACK_END is generated. A second busy control circuit 228 generates a software busy signal SW_BUSY under the control of the CPU 210. A third busy circuit 230 provides a busy signal BUSY_OUT to the host when both the hardware busy signal HW_BUSY and the software busy signal SW_BUSY are generated.

Figure 3:
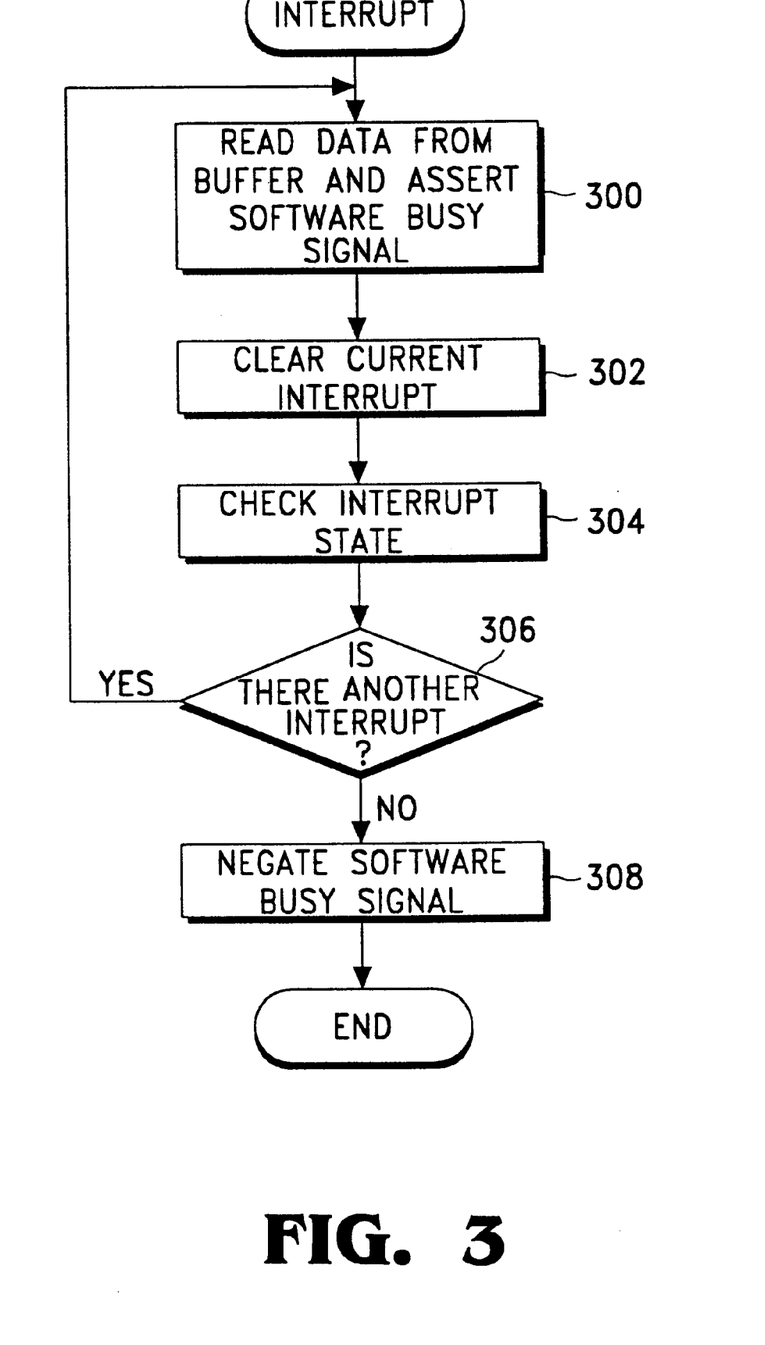
FIG. 3 is a flow chart showing the processing procedure of the CPU shown in FIG. 2 according to the present invention.
Figure 4A:
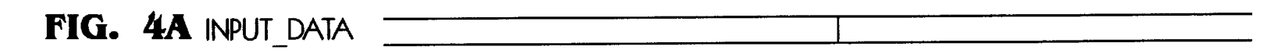
FIG. 4 is a timing chart showing an operation of each portion of FIG. 2 when data are normally received from a host.
Figure 4B:
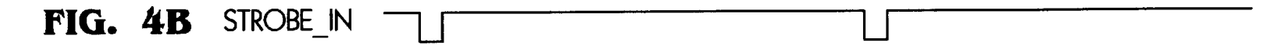
Figure 4C:
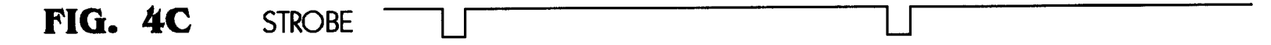
Figure 4D:
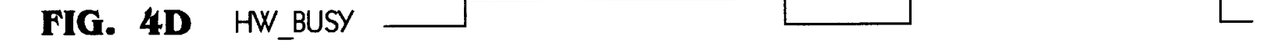
Figure 4E:
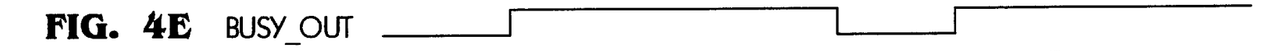
Figure 4F:
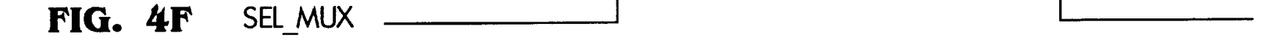
Figure 4G:
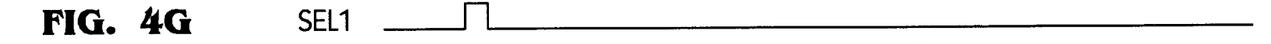
Figure 4H:
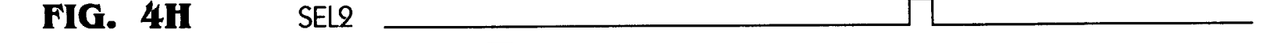
Figure 4I:
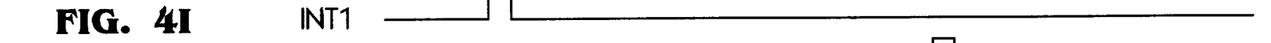
Figures 4J, 4K, 4L:
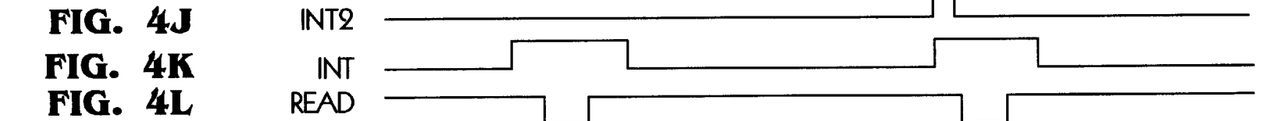
Figure 4M:
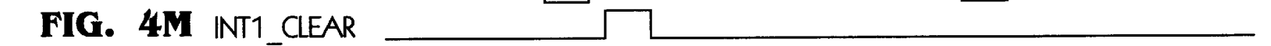
Figure 4N:
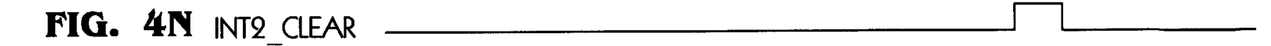
Figure 4O:
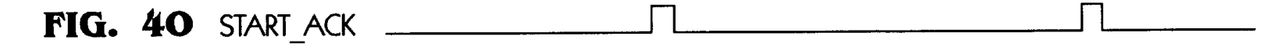
Figure 4P:
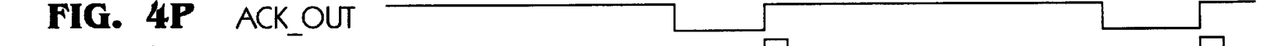
Figure 4Q:
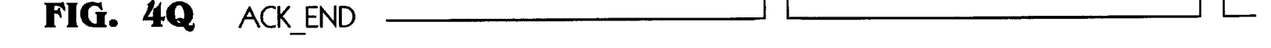
Figure 5A:
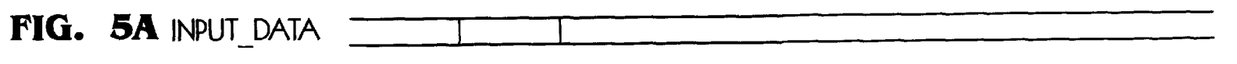
FIG. 5 is a timing chart showing an operation of each portion of FIG. 2 when data are abnormally received from a host.
Figures 5B, 5C, 5D, 5E:
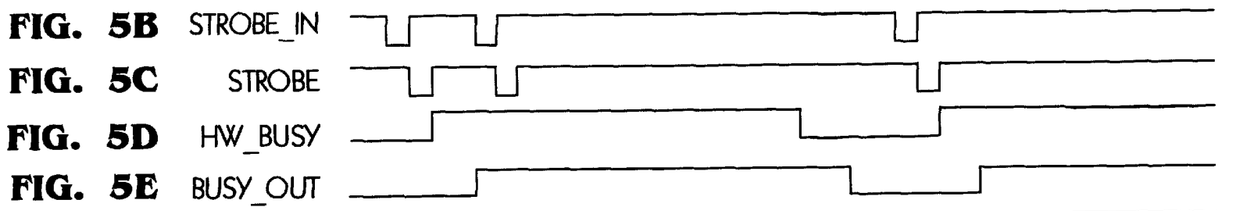
Figures 5F, 5G, 5H, 5I, 5J:
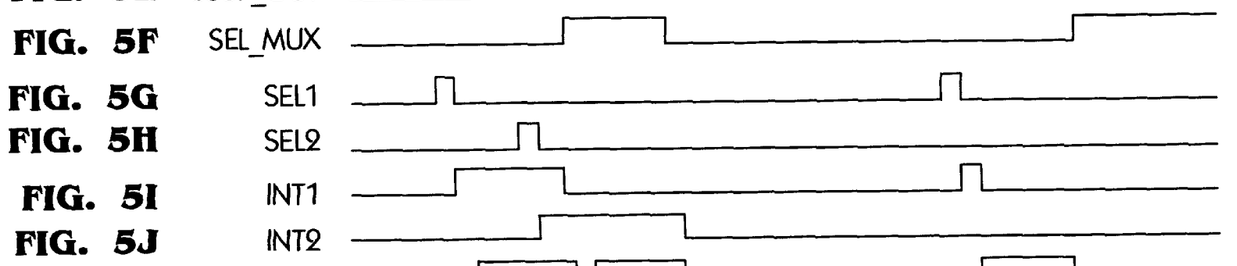
Figures 5K, 5L, 5M, 5N:
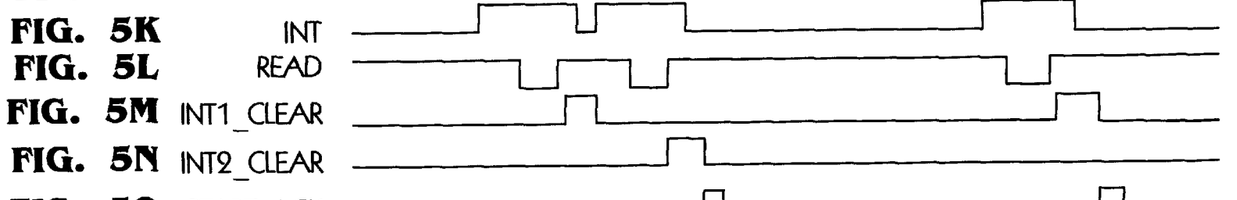
Figures 5O, 5P, 5Q:
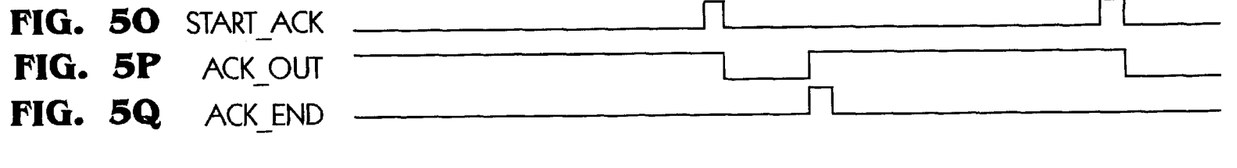

FIG. 3 is a flow chart showing a processing procedure of the CPU 210 shown in FIG. 2; FIG. 4 is a timing chart showing an operation of each portion of FIG. 2 when data are normally received from the host, that is, when the host transmits subsequent data after the host transmits one byte of data and then the third busy control circuit 230 generates the busy signal BUSY_OUT; and FIG. 5 is a timing chart showing an operation of each portion of FIG. 2 when the host transmits subsequent data before the third busy control circuit 230 generates the busy signal BUSY_OUT after the host transmits one byte of data.

Referring to FIGS. 2 thru 5, in operation, if the strobe input signal STROBE_INPUT is received from the host, the noise filter 200 generates a constant-width strobe signal STROBE in order to prevent an interface error generated by noise. The first, second and third busy control circuits 226, 228 and 230 in combination generate the busy signal BUSY_OUT and circuit 230 transmits it to the host in synchronization with the clock signal CLOCK of the CPU 210, as shown in FIGS. 4 and 5, and maintain the busy signal BUSY_OUT until the acknowledge end signal ACK_END is generated by the acknowledge control circuit 224.

In this case, the select logic circuit 202 causes the input data INPUT_DATA received from the host to be stored in one of the first and second latch circuits 212 and 214, respectively, in response to the strobe signal STROBE, and generates the first and second select signals SEL1 and SEL2 in order to generate the CPU interrupt signal INT. The select logic circuit 202 alternately generates the first and second select signals SEL1 and SEL2 each time the strobe signal STROBE is received. In other words, as shown in FIGS. 4 and 5, if the strobe signal STROBE is received after an initial state, the first select signal SEL1 is activated and, if the next strobe signal STROBE is received, the second select signal SEL2 is activated. Hence, the input data INPUT_DATA received from the host are latched in the first and second latch circuits 212 and 214, respectively, by the first and second select signals SEL1 and SEL2, respectively.

The first and second interrupt control circuits 204 and 206 generate respectively, the first and second interrupt signals INT1 and INT2, respectively, as a result of the first and second select signals SEL1 and SEL2, respectively, as shown in FIGS. 4 and 5. The first and second interrupt control circuits 204 and 206 maintain the first and second interrupt signals INT1 and INT2, respectively, until the first and second interrupt clear signals INT1_CLEAR and INT2_CLEAR, respectively, are generated by the CPU 210. The CPU interrupt control circuit 208 supplies the CPU interrupt signal INT to the CPU 210 as a result of the first and second interrupt signals INT1 and INT2, respectively. If another interrupt signal is generated before a previously generated one of the first and second interrupt signals INT1 and INT2 is cleared by the CPU 210, as shown in FIG. 5, the CPU interrupt control circuit 208 continues to maintain the interrupt signal INT until that interrupt signal is cleared so that the CPU 210 may implement the next interrupt.

By means of the interrupt signal INT, the CPU 210 generates the read signal READ to read data stored in the buffer 218, and generates the software busy signal SW_BUSY of the second busy control circuit 228 at step 300 shown in FIG. 3. The multiplexer 216 selectively generates data latched in the first and second latch circuits 212 and 214, respectively, as a result of the multiplexer select signal SEL_MUX having different logic states as alternately generated by the select control circuit 220. The selectively generated data are stored in the buffer 218 and supplied to the CPU 210. The CPU 210 clears a current interrupt by generating one of the first and second interrupt clear signals INT1_CLEAR and INT2_CLEAR, respectively, at step 302. That is, if the current interrupt signal INT is generated by the first interrupt signal INT1, the CPU 210 generates the first interrupt clear signal INT1_CLEAR and, if it is generated by the second interrupt signal INT2, the CPU 210 generates the second interrupt clear signal INT2_CLEAR. Therefore, the current interrupt is cleared as shown in FIGS. 4 and 5. The CPU 210 confirms the current interrupt by checking the state of the CPU interrupt control circuit 208 at step 304. If there is another interrupt, the CPU 210 returns to step 300; if not, the CPU 210 negates the software busy signal SW_BUSY at step 308.

Meanwhile, the acknowledge start control circuit 222 is triggered by the first or second interrupt clear signal INT1_CLEAR or INT2_CLEAR, respectively, and generates the acknowledge start signal START_ACK for operating the acknowledge control circuit 224. The acknowledge control circuit 224 loads a value previously written by the CPU 210 in response to the acknowledge start signal START_ACK, begins to count, and maintains the acknowledge signal ACK_OUT until counting is ended according to the loaded value as shown in FIGS. 4 and 5. The acknowledge control circuit 224 generates the acknowledge end signal ACK_END when the counting is ended. The busy signal BUSY_OUT, which is an output of the third busy control circuit 230, is activated by the strobe signal STROBE and maintains its state. If the acknowledge end signal ACK_END is generated, the busy signal BUSY_OUT is negated.

Therefore, two bytes of successive data can be received. If the inventive host interface circuit is used in a low-speed image forming apparatus and connected to a high-speed host, a collision between received data and the loss of data can be prevented. That is, even if subsequent data and the strobe signal are transmitted before the busy signal is generated by the image forming apparatus and after the host transmits one byte of data, the subsequent data can be received without loss. Furthermore, since the acknowledge signal ACK_OUT is hardware-generated by the acknowledge start control circuit 222 and the acknowledge control circuit 224, the CPU 210 can be more efficiently used.

Consequently, the interface speed with the host can be increased and loss of data eliminated even though the high-speed host is connected to a low-speed image forming apparatus.

As noted above, the collision between data and the loss of data can be prevented and the interface speed with the host improved. Moreover, the CPU is not subject to load.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A host interface circuit for interfacing parallel data received from a host and provided to an image forming apparatus, said host interface circuit comprising:

means for receiving a strobe input signal from said host and for generating latch selection signals; and first and second latch circuits connected to said receiving means for receiving said latch selection signals and for latching data in response thereto;

wherein said data received from said host are alternately latched by said first and second latch circuits each time said strobe input signal is received from said host;

said circuit further comprising acknowledge circuit means for generating an acknowledge signal and busy control circuit means for transmitting a busy signal to said host from a time corresponding to input of said strobe signal to a further time corresponding to an end of said acknowledge signal.

2. A host interface circuit as set forth in claim 1, wherein data latched in said first and second latch circuits are sequentially read.

3. A host interface circuit as set forth in claim 1, wherein, if a subsequent strobe input signal is received before data latched in one of said first and second latch circuits are read in response to a previous strobe input signal, data latched in another of said first and second latch circuits are read, and said acknowledge circuit means transmits an acknowledge signal to said host for a predetermined time interval.

4. A host interface circuit for interfacing data received from a host by an image forming apparatus, said host interface circuit comprising:

means for receiving a strobe input signal from said host;

select logic circuit means for alternately generating first and second select signals each time that said strobe input signal is received from said host;

first interrupt control circuit means connected to said select logic circuit means for generating a first interrupt signal in response to said first select signal and being cleared by a first interrupt clear signal;

second interrupt control circuit means connected to said select logic circuit means for generating a second interrupt signal in response to said second select signal and being cleared by a second interrupt clear signal;

central processing unit (CPU) interrupt control circuit means connected to said first and second interrupt control circuit means for generating a CPU interrupt signal each time that said first and second interrupt signals are generated;

first and second latch circuits for alternately latching said data received from said host together with said strobe input signal in response to said first and second select signals, respectively;

multiplexer means connected to said first and second latch circuits for alternately conveying data latched in said first and second latch circuits according to a multiplexer select signal;

select control circuit means connected to said multiplexer means for alternately generating said multiplexer select signal with different logic states whenever a read signal is received;

buffer means connected to said multiplexer means for storing data conveyed by said multiplexer means in accordance with said read signal;

CPU means for generating said read signal each time that said CPU interrupt signal is generated so as to read data stored in said buffer means, and for generating one of said first and second interrupt clear signals corresponding to a current interrupt;

acknowledge start control circuit means connected to said first and second interrupt control circuit means for generating an acknowledge start signal when one of said first and second interrupt signals is cleared by a corresponding one of said first and second interrupt clear signals;

acknowledge control circuit means connected to said acknowledge state control circuit means for providing an acknowledge signal to said host in response to said acknowledge start signal, for negating said acknowledge signal after a predetermined period of time, and for generating an acknowledge end signal;

first busy control circuit means for generating a hardware busy signal in response to said strobe input signal until said acknowledge end signal is generated;

second busy control circuit means for generating a software busy signal under the control of said CPU means; and third busy control circuit means for transmitting a busy signal to said host when both said hardware busy signal and said software busy signal are generated.

5. A host interface circuit as set forth in claim 4, wherein, if a subsequent interrupt signal is generated before a previously generated one of said first and second interrupt signals is cleared, said CPU interrupt control circuit means continues to maintain said CPU interrupt signal until said generated one of said first and second interrupt signals is cleared.

6. A host interface circuit as set forth in claim 5, wherein, if a subsequent CPU interrupt signal is generated after one of said first and second interrupt clear signals is generated, said CPU again generates said read signal to read data stored in said buffer means and generates one of said first and second interrupt clear signals corresponding to a current interrupt.

7. A host interface circuit as set forth in claim 6, wherein said acknowledge control circuit means loads a value supplied from said CPU means in response to said acknowledge start signal and uses said value to count said predetermined period of time.

8. A host interface circuit as set forth in claim 7, further comprising noise filter means connected to said select logic circuit means for filtering said strobe input signal to obtain a constant-width strobe input signal, and for providing said constant-width strobe input signal to said select logic circuit means.

9. A host interface circuit for interfacing data received from a host by an image forming apparatus, said host interface circuit comprising:

receiving means for receiving a strobe input signal from said host;

select logic means for alternately generating first and second select signals each time that said strobe input signal is received from said host;

interrupt control means connected to said select logic means and responsive to said first and second select signals generated by said select logic means for generating a central processing unit (CPU) interrupt signal each time that said first and second select signals are generated by said select logic means;

first and second latch circuits for alternately latching said data received from said host together with said strobe input signal in response to said first and second select signals, respectively;

data transfer means for alternately transferring data latched in said first and second latch circuits, respectively, in accordance with a read control signal; and CPU means for generating said read control signal each time that said interrupt signal is generated by said interrupt control means.

10. A host interface circuit for interfacing data received from a host by an image forming apparatus, said host interface circuit comprising:

receiving means for receiving a strobe input signal from said host;

select logic means for alternately generating first and second select signals each time that said strobe input signal is received from said host;

first and second latch circuits for alternately latching said data received from said host together with said strobe input signal in response to said first and second select signals, respectively; and data transfer means for alternately transferring data latched in said first and second latch circuits, respectively, in accordance with a read control signal;

wherein said data transfer means comprises a multiplexer connected to said first and second latch circuits for alternately conveying said data latched in said first and second latch circuits, and a buffer connected to said multiplexer for storing data conveyed by said multiplexer in accordance with said read control signal.

11. A host interface circuit as set forth in claim 10, further comprising select control circuit means connected to said multiplexer for alternately generating a multiplexer select signal having different logic states whenever said read control signal is generated, said multiplexer being responsive to said multiplexer select signal for alternately conveying said data latched in said first and second latch circuits, respectively.

12. A host interface circuit for interfacing data received from a host by an image forming apparatus, said host interface circuit comprising:

receiving means for receiving a strobe input signal from said host;

select logic means for alternately generating first and second select signals each time that said strobe input signal is received from said host;

interrupt control means connected to said select logic means for generating a central processing unit (CPU) interrupt signal each time that said first and second select signals are generated;

first and second latch circuits for alternately latching said data received from said host together with said strobe input signal in response to said first and second select signals, respectively;

wherein said interrupt control means comprises a first interrupt control circuit connected to said select logic means for generating a first interrupt signal in response to said first select signal and being cleared by a first interrupt clear signal, and a second interrupt control circuit connected to said select logic means for generating a second interrupt signal in response to said second select signal and being cleared by a second interrupt clear signal.

13. A host interface circuit as set forth in claim 12, further comprising CPU interrupt control means connected to said first and second interrupt control circuits for generating a CPU interrupt signal each time that said first and second interrupt signals are generated.

14. A host interface circuit as set forth in claim 13, further comprising CPU means for generating a read control signal each time that said CPU interrupt signal is generated by said CPU interrupt control circuit.

15. A host interface circuit for interfacing data received from a host by an image forming apparatus, said host interface circuit comprising:

receiving means for receiving a strobe input signal from said host;

select logic means for alternately generating first and second select signals each time that said strobe input signal is received from said host; and first and second latch circuits for alternately latching said data received from said host together with said strobe input signal in response to said first and second select signals, respectively;

further comprising acknowledge start control means for generating an acknowledge start signal, and acknowledge control means connected to said acknowledge start control means for providing an acknowledge signal to said host in response to said acknowledge start signal, for negating said acknowledge signal after a predetermined period of time has elapsed, and for generating an acknowledge end signal.

16. A host interface circuit as set forth in claim 15, further comprising a first interrupt control circuit and a second interrupt control circuit for generating first and second interrupt signals, respectively, said first and second interrupt signals being cleared by first and second interrupt clear signals, respectively, and wherein said acknowledge start control means generates said acknowledge start signal when said first and second interrupt signals are cleared by said first and second interrupt clear signals, respectively.

17. A host interface circuit for interfacing data received from a host by an image forming apparatus, said host interface circuit comprising:

receiving means for receiving a strobe input signal from said host;

select logic means for alternately generating first and second select signals each time that said strobe input signal is received from said host; and first and second latch circuits for alternately latching said data received from said host together with said strobe input signal in response to said first and second select signals, respectively;

further comprising first busy control means for generating a hardware busy signal in response to said strobe input signal, and second busy control means for generating a software busy signal.

18. A host interface circuit as set forth in claim 17, further comprising third busy control means for transmitting a busy signal to said host when both said hardware busy signal and said software busy signal are generated by said first and second busy control means, respectively.

19. A host interface circuit as set forth in claim 17, further comprising acknowledge control means for providing an acknowledge signal to said host, and for generating an acknowledge end signal upon cessation of provision of said acknowledge signal, and wherein said first busy control means generates said hardware busy signal in response to said strobe input signal until said acknowledge end signal is generated by said acknowledge control means.

20. A host interface circuit as set forth in claim 10, further comprising interrupt control means connected to said select logic means and responsive to said first and second select signals generated by said select logic means for generating a central processing unit (CPU) interrupt signal each time that said first and second select signals are generated by said select logic means, and CPU means for generating said read control signal each time that said interrupt signal is generated by said interrupt control means.

21. A host interface circuit as set forth in claim 12, further comprising data transfer means for alternately transferring data latched in said first and second latch circuits, respectively, in accordance with a read control signal, and CPU means for generating said read control signal each time that said interrupt signal is generated by said interrupt control means.

22. A host interface circuit as set forth in claim 15, further comprising interrupt control means connected to said select logic means and responsive to said first and second select signals generated by said select logic means for generating a central processing unit (CPU) interrupt signal each time that said first and second select signals are generated by said select logic means.

23. A host interface circuit as set forth in claim 22, further comprising data transfer means for alternately transferring data latched in said first and second latch circuits, respectively, in accordance with a read control signal, and CPU means for generating said read control signal each time that said interrupt signal is generated by said interrupt control means.

24. A host interface circuit as set forth in claim 17, further comprising interrupt control means connected to said select logic means and responsive to said first and second select signals generated by said select logic means for generating a central processing unit (CPU) interrupt signal each time that said first and second select signals are generated by said select logic means.

25. A host interface circuit as set forth in claim 24, further comprising data transfer means for alternately transferring data latched in said first and second latch circuits, respectively, in accordance with a read control signal, and CPU means for generating said read control signal each time that said interrupt signal is generated by said interrupt control means.

* * * * *